Nov. 28, 1944.   A. L. PUGH, JR   2,363,900
MOLDING APPARATUS
Filed April 15, 1941
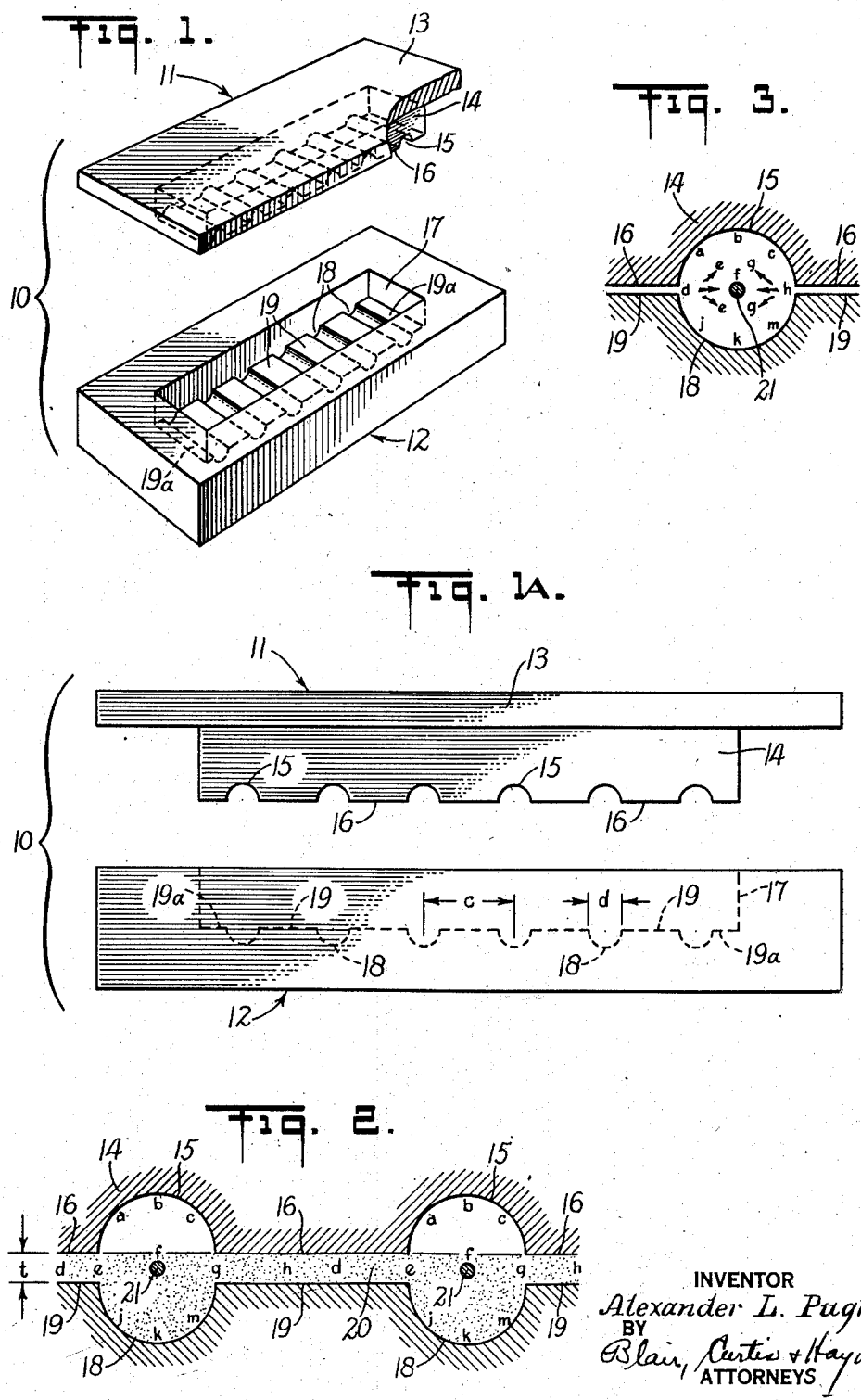
INVENTOR
Alexander L. Pugh, Jr.
BY
Blair, Curtis & Hayward
ATTORNEYS Patented Nov. 28, 1944

2,363,900

UNITED STATES PATENT OFFICE 2,363,900

MOLDING APPARATUS

Alexander L. Pugh, Jr., Bala-Cynwyd, Pa., assignor to International Resistance Company, Philadelphia, Pa., a corporation of Delaware Application April 15, 1941, Serial No. 388,581

5 Claims. (Cl. 18—42)

This invention relates to molding apparatus, and more particularly to apparatus for molding an article adapted to have a frangible insert embedded therein.

One of the objects of this invention is to provide molding apparatus which is simple, inexpensive and sturdy in construction, and which is efficient in operation. Another object is to provide molding apparatus capable of filling high production requisites over an extended period of operation without breakage or substantial deterioration. Another object is to provide molding apparatus capable of molding articles having fragile inserts embedded therein, without damage or displacement to the inserts. Another object is to provide molding apparatus capable of producing molded articles characterized by uniformity in density and dimension. Other objects will be in part apparent and in part pointed out hereinafter.

The invention accordingly consists in the features of construction, combinations of elements and arrangements of parts as will be exemplified in the structure to be hereinafter described, and the scope of the application of which will be indicated in the following claims.

In the drawing, wherein there is shown two embodiments of my invention,

Figure 1 is a perspective view of my molding apparatus, a portion thereof being broken away;

Figure 1A is an enlarged front elevation of my molding apparatus showing the halves thereof separated;

Figure 2 is an enlarged sectional elevation of a portion of my mold showing the halves thereof partially closed;

Figure 3 is a view similar to Figure 2, but showing the mold halves closed.

Similar reference characters refer to similar parts throughout the various views of the drawing.

To clarify certain aspects of the invention, it should be noted that the molding of articles having fragile inserts such as glass filaments, for example, therein, gives rise to troublesome manufacturing problems. In the first place, the molding material acts like a highly viscous liquid, the value of viscosity frequently varying considerably because of such factors as temperature, pressure, time and previous treatment of the material. Because of this variation, the high stresses developed on the inserts during the molding operation cannot be predicated or controlled in most conventional molds, and hence the flow of the molding material which creates the stresses often bends or breaks the inserts, or moves them out of position.

When a thermosetting material such as a phenol condensation compound is molded, it goes through several chemical reactions or polymerizing stages when subjected to heat and pressure. If in its liquid state, the properties of such material were such that the forces developed during molding were purely hydrostatic, the pressure at any point in the mold would be uniform as to magnitude and direction and hence such forces acting on an insert would be balanced so that no breakage, damage or distortion of the insert would result. This is, of course, an ideal condition unattainable under high production requirements or without the use of expensive and complicated apparatus.

Conventional types of molding apparatus are incapable of efficient production of molded articles in which a fragile insert is embedded and it is to the end of solving the problems arising from the use of such molds that my mold, as will be now described, is directed.

Referring now to Figure 1A, my mold, which is generally indicated at 10, comprises an upper half or plunger generally indicated at 11, and a lower half or mold cavity generally indicated at 12.

Mold plunger 11 includes a top plate 13 from which a plunger 14 extends. Plunger 14 has formed in the bottom thereof a plurality of molding recesses 15 which are equidistantly spaced by lands 16. Mold cavity 12 has a reservoir 17 (Figure 1) formed therein and in the bottom of this reservoir are formed recesses 18 equidistantly spaced from one another by lands 19. Recesses 18 are complementary to recesses 15 and lie opposite thereto when the two parts of the mold are closed. Thus lands 19 are opposite lands 16 when the mold parts are closed.

Lands 16 and 19 are usually wider than the diameters of recesses 15 and 18, and are preferably proportioned to hold the proper amount of granular molding material under predetermined conditions, as will appear hereinbelow. It should also be noted, however, that the substantial width of the lands lends great rigidity to the effective part of the mold, thus assuring its long life in operation.

From the above, it may be seen that my mold is of the sub-cavity type but has unusually wide lands between the mold cavities which are so proportioned as to greatly resist breaking or displacing of the inserts. I have also found that the volume of a charge of molding material that is placed upon the lands should be between approximately 65% and 85%, preferably 75% of the volume change during molding. The result of this is that the distance $c$ from the center of one mold cavity to the center of the next adjacent mold cavity (see Figure 1A) or the width of the plunger including its lands for a single cavity mold may be derived from the following equation:

$$c = d\frac{(B-\frac{1}{2})}{(1-K)(B-1)+\frac{1}{2}}$$

where, with reference to Figure 1A $c$ = center to center distance between adjacent recesses or the width of the plunger for a single recess mold
$d$ = diameter of or distance across a single molding cavity or recess
$B$ = bulk factor of molding material
$K$ = constant whose value is between approximately 65% and 85%, but preferably 75%

If $K = \frac{3}{4}$, this equation can be further simplified to $$c = 2d\frac{2B-1}{B+1}$$

These formulae may be derived as follows where the width of the molded piece is $d$, its cross sectional area is $A$, its length is $L$, and the depth of molding material on the lands is $t$:

(1) Volume of the finished piece = $AL$
(2) Total volume of molding material loaded per cavity =

$$BAL = \left(tc + \frac{A}{2}\right)L$$

(3) Change in volume of molding material on molding per cavity = $(B-1)AL$
(4) Volume of molding material loaded on lands per cavity = $t(c-d)L$
(5) Ratio of:

$$\frac{\text{molding material on lands}}{\text{change in volume of molding material}} =$$

$$\frac{t(c-d)L}{(B-1)AL} = K$$

(6) Rewrite (2) cancelling $L$ and solving for $t$, $$t = \frac{A(2B-1)}{2c}$$

(7) Substituting $t$ and cancelling $L$ in (5), $$K = \frac{A(2B-1)(c-d)}{2c(B-1)A}$$

(8) Cancelling $A$ and transforming—

$$\frac{2c}{c-d} = \frac{2B-1}{K(B-1)}$$

(9) Inverting and separating, $$\frac{1}{2} - \frac{d}{2c} = \frac{K(B-1)}{2B-1}$$

(10) Regrouping and cancelling 2, $$\frac{d}{c} = \frac{2B-1-2K(B-1)}{2B-1}$$

(11) Inverting and regrouping, $$c = \frac{d(2B-1)}{B(2-2K)+2K-1}$$

(12) Dividing numerator and denominator by 2 and regrouping, $$c = d\frac{(B-\frac{1}{2})}{(1-K)(B-1)+\frac{1}{2}}$$

which can be used to determine $c$ from $d$, $B$ and $K$. Postulate value of $K$ as $\frac{3}{4}$, Equation 12 can be further simplified by substituting this value in the equation, as follows:

$$(13) \quad c = 2d\frac{2B-1}{B+1}$$

which is the form I prefer to use in design of molds to mold around fragile inserts.

From the above, it may be seen that most of the factors that influence the movement of molding material as the mold parts are brought together are present in the formula. Bulk ratio, which, as noted above, is the ratio of the volume of the original molding material to the volume of the molded piece, is included. Volume of molding material which is a linear function of cross sectional area in the cylinder is also included. I have found by experience that assigning a minimum value of two-thirds, but preferably three-fourths to the empirical constant $K$ gives satisfactory results. In operation the inserts 21 are centrally placed in the several recesses 18 in the plane of the surfaces of lands 19. Thereafter the molding material 20, which is preferably in granular or powdered form, is placed within reservoir 17 to a depth where it fills recesses 18 and covers lands 19 and 19a sufficiently to yield a satisfactory product. The mold plunger 14 and reservoir 17 are then heated to a suitable temperature, and when they are forced together at the desired pressure, the molding material 20 lying on the lands 19 (Figure 3) is transformed by heat and pressure into a fluid at a varying viscosity which enters recesses 15 and 18 (Figure 3) from either side thereof and hence at right angles to the direction of motion of the mold plunger (as indicated by reference letters $d$ and $h$). Thus the forces acting on inserts 21 are substantially equalized. The molding material 20 after entering recesses 15 and 18 flows upwardly into recess 15, downwardly into recess 18 directly toward insert 21 from opposite directions and accordingly around the insert, as indicated by the arrows and reference letters $e$ and $g$. Thus, the forces impressed on the insert are so balanced that the insert is neither displaced nor broken. It may accordingly be seen that with the balance in flow and pressure, substantial molding pressure may be utilized without injuring the insert. Hence through the use of my mold the forces resulting from molding pressure are uniformly distributed and balanced about the inserts 21.

Although the volume of the insert has not been taken into consideration in the analysis, I find that in practice this method of design gives the proper proportions for molding around inserts of a variety of sizes.

Thus I have provided a mold which can effectively mold articles having fragile inserts therein, without displacing or fracturing the inserts, and which effectively attain the various other objects hereinabove set forth.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a two-piece sub-cavity mold designed for molding a plastic material having a bulk factor greater than 1 around a fragile element, the combination of two opposing pieces having similar opposing molding cavities and lands so constructed that the center to center distance between adjacent recesses equals approximately three times the diameter of one recess.

2. In a two-piece sub-cavity mold designed for molding a plastic material having a bulk factor greater than 1 around a fragile element, the combination of two opposing pieces having similar opposing molding recesses and lands so constructed that the ratio of the center to center distance between adjacent recesses to the diameter of one recess is equal to a value falling between the range of 2 to 3.

3. In a two-piece sub-cavity mold designed for molding a plastic material having a bulk factor greater than 1 around a fragile element, the combination of two opposing pieces having similar opposing molding recesses and lands so constructed that the ratio of the center to center distance between adjacent recesses to the diameter of one recess is on the order of two to three where the value of the ratio of the volume of said unmolded plastic material before molding to the volume of the molded article is greater than unity but no greater than five.

4. In a two-piece sub-cavity mold designed for molding a plastic material having a bulk factor greater than 1 around a fragile element, the combination of two opposing pieces having similar opposed molding recesses and lands, the width of the land serving its adjacent recess being derived from the formula $$c = 2d\frac{2B-1}{B+1}$$

where $c$ equals the width of the lands serving the recess plus the diameter of the recess, $d$ equals the diameter of or the distance across the recess, and $B$ equals the bulk factor of said molding material.

5. In subcavity molding apparatus, in combination, a mold plunger having alternate lands and recesses, the area of the land between adjacent recesses being substantially greater than the horizontal cross sectional area of one of said recesses, the width of each land serving its adjacent recess being derived from the formula $$c = 2d\frac{2B-1}{B+1}$$

where $c$ equals the width of the lands serving the recess plus the diameter of the recess, $d$ equals the diameter of or the distance across the recess, and $B$ equals the bulk factor of the material to be molded.

ALEXANDER L. PUGH, Jr.